(12) United States Patent
Pelizzoni et al.

(10) Patent No.: US 9,845,762 B2
(45) Date of Patent: Dec. 19, 2017

(54) CONTROL APPARATUS FOR OPERATING A FUEL INJECTOR

(71) Applicant: GM GLOBAL TECHNOLOGY OPERATIONS LLC, Detroit, MI (US)

(72) Inventors: Ivan Pelizzoni, Turin (IT); Luca Lauritano, Turin (IT)

(73) Assignee: GM Global Technology Operations LLC, Detroit, MI (US)

(*) Notice: Subject to any disclaimer, the term of this patent is extended or adjusted under 35 U.S.C. 154(b) by 178 days.

(21) Appl. No.: 14/494,342

(22) Filed: Sep. 23, 2014

(65) Prior Publication Data
US 2015/0088403 A1  Mar. 26, 2015

(30) Foreign Application Priority Data
Sep. 23, 2013 (GB) .................................. 1316870.3

(51) Int. Cl.
*F02D 41/38* (2006.01)
*F02D 41/00* (2006.01)
*F02D 41/40* (2006.01)

(52) U.S. Cl.
CPC ....... *F02D 41/3809* (2013.01); *F02D 41/009* (2013.01); *F02D 41/402* (2013.01); *F02D 2041/389* (2013.01); *F02D 2200/0602* (2013.01); *F02D 2250/12* (2013.01); *F02D 2250/14* (2013.01); *Y02T 10/44* (2013.01)

(58) Field of Classification Search
CPC ........... F02D 2200/0602; F02D 41/247; F02D 41/3809; F02D 41/009; F02D 41/402
See application file for complete search history.

(56) References Cited

U.S. PATENT DOCUMENTS

| | | | |
|---|---|---|---|
| 6,227,168 B1 * | 5/2001 | Nishiyama | F02D 41/401 123/456 |
| 6,276,337 B1 * | 8/2001 | Minato | F02D 41/20 123/456 |
| 2008/0060617 A1 | 3/2008 | Adachi et al. | |
| 2010/0179744 A1 * | 7/2010 | Baranowski | F02D 41/2416 701/103 |
| 2011/0224888 A1 * | 9/2011 | Girotto | F02D 41/123 701/103 |

FOREIGN PATENT DOCUMENTS

| JP | 0361649 | 3/1991 |
|---|---|---|
| JP | 2005248721 A | 9/2005 |

* cited by examiner

*Primary Examiner* — Hai Huynh
*Assistant Examiner* — Gonzalo Laguarda
(74) *Attorney, Agent, or Firm* — Lorenz & Kopf, LLP

(57) ABSTRACT

A control apparatus is disclosed for operating a fuel injector of an internal combustion engine. The control apparatus includes an Electronic Control Unit configured to: perform a first calculation task in order to calculate a set of Start Of Injection values ($SOI_i$) of a train of injections, calculate an angular position (DIAngPos) of the crankshaft defining the start of a second calculation task, and perform the second calculation task in order to calculate a set of values ($ET_i$) of the energizing time of the injections of the train. The angular position (DIAngPos) is calculated as a function of the Start Of Injection value (FirstSOI) of the first injection of the train as calculated by the first calculation task.

11 Claims, 6 Drawing Sheets

CONTROL APPARATUS FOR OPERATING A FUEL INJECTOR

CROSS REFERENCE TO RELATED APPLICATION

This application claims priority to Great Britain Patent Application No. 1316870.3 filed Sep. 23, 2013, which is incorporated herein by reference in its entirety.

TECHNICAL FIELD

The technical field relates to a control apparatus for operating a fuel injector in an internal combustion engine. In particular, the present disclosure relates to a control apparatus for operating a fuel injector an internal combustion engine to improve the fuel injection actuation accuracy.

BACKGROUND

An internal combustion engine (ICE) for a motor vehicle generally includes an engine block which defines at least one cylinder accommodating a reciprocating piston coupled to rotate a crankshaft. The cylinder is closed by a cylinder head that cooperates with the reciprocating piston to define a combustion chamber. A fuel and air mixture is cyclically disposed in the combustion chamber and ignited, thereby generating hot expanding exhaust gasses that cause the reciprocating movements of the piston. The fuel is injected into each cylinder by a respective fuel injector. The fuel is provided at high pressure to each fuel injector from a fuel rail in fluid communication with a high pressure fuel pump that increase the pressure of the fuel received from a fuel source.

Generally speaking, internal combustion engines are currently operated with multi-injection patterns, namely for each engine cycle, a train of several injection pulses is performed. A typical train of injections may start from a pilot injection pulse being followed by one or more pre-injections, by main injection pulse, eventually terminating with one or more after and/or post injections.

For each of these injections an Electronic Control Unit (ECU) may receive input signals representative of various physical parameters associated with the ICE from various sensors and may execute suitable calculation tasks to determine the relevant physical parameters of each fuel injection as a function of several factors, such as the above received signals, engine speed, engine torque request, rail pressure, after-treatment procedures and the like. The fuel injectors are then actuated according to the calculated parameters.

As it is known in the art, the most important injection parameters are the Start of Injection (SOI) which indicates the time value at which an injection is started and the Energizing Time (ET) of the fuel injector which indicates the length of time during which a fuel injector is energized during an injection pulse. Furthermore, the Dwell Time (DT) indicates the time interval included between two consecutive injection pulses, namely the time interval between the end of the Energizing Time (ET) of a first injection pulse and the Start of Injection (SOI) of a second consecutive injection pulse. Timing of the SOI may be measured in degrees of the crank angle of the piston before top dead center (BTDC), which is the highest position the piston reaches in the cylinder.

In order to calculate the parameters of a train of injection pulses, it is known in the art of engine control to perform in succession two ECU tasks, namely LORES Compression task and DI_Scheduling task. The LORES Compression task estimates: pulses number, pulses fuel quantities, start of injection (SOI) and DT (Dwell Time) for all pulses. Moreover, the LORES Compression task also calculates the angular position of the start of the calculations of the following DI_Scheduling task. The DI_Scheduling task calculates all Energizing Times (ET) for all pulses on the basis of the previous data and on a rail pressure sampled value.

However, there is a certain time delay between the start of the DI_Scheduling task start and the first instant of the injection actuation. This delay is due to the time needed by the electronic controller unit to run all computations that must be performed in the DI_Scheduling task. During this delay, engine conditions such as engine speed or rail pressure may change and this phenomena may cause injection inaccuracy and injection s effects not in line with the real expectations of the driver and with the engine conditions in that moment.

SUMMARY

A control apparatus and fuel control strategy is disclosed which calculates the final parameters for the injection actuation for an electrically actuated fuel injector system in a closer position with respect to the actual injection by means of a simple, rational and inexpensive solution.

An embodiment of the disclosure provides a control apparatus for operating a fuel injector of an internal combustion engine including a cylinder housing a piston connected to a crankshaft and a fuel rail in fluid communication with the fuel injector to inject fuel into the cylinder. The control apparatus includes an Electronic Control Unit configured to perform a first calculation task in order to calculate a set of Start Of Injection values of a train of injections, calculate an angular position of the crankshaft defining the start of a second calculation task, and perform the second calculation task in order to calculate a set of values of the energizing time of the injections of the train. The angular position is calculated as a function of the Start Of Injection value of the first injection of the train as calculated by the first calculation task.

An advantage of this embodiment is that it provides a more accurate rail pressure sampling for the injection actuation. This is helpful to improve the accuracy of the injection actuation and have it in line with the real expectations of the driver and of the engine conditions in that moment.

According to another embodiment of the present disclosure, the Electronic Control Unit is configured to calculate the predicted Start Of Injection value of the first actual injection of the train starting from a Start Of Injection value of a main injection and subtracting the sum of all the energizing times and dwell times of all injections of the train terminating before the Top Dead Center Compression of the piston. An advantage of this embodiment is that it calculates the actual first Start Of Injection for each train of injections.

According to a further embodiment of the present disclosure, the Electronic Control Unit is configured to calculate the energizing times of all the injections terminating before the Top Dead Center Compression of the piston as a function of a fuel rail pressure value sampled at the time of the performance of the first calculation task. This embodiment has the advantage that it allows to estimate the energizing time values of the various injections of the train in order to calculate the actual first Start Of Injection for each train of injections.

According to another embodiment of the present disclosure, the Electronic Control Unit is configured to receive fuel rail pressure values sampled by a pressure rail sensor at different instants in time during the performance of the train of injections and to use the sampled fuel rail pressure values to calculate the energizing time of the remaining injections in the train of injections. An advantage of this embodiment is that it gives more accurate information for the rail pressure having only one pressure value for the whole injection pattern, improving injection accuracy.

According to still another embodiment of the present disclosure, the Electronic Control Unit is configured to calculate the angular position DIAngPos defining the start of the second calculation task according to the formula:

$$DIAngPos=ceil\{[(FuelCal+HWIODelay)_{ang}+FirstSOI+Margin]/AngTooth\}*AngTooth$$

where FuelCal indicates the worst case execution time for the calculations performed in the second calculation task, HWIODelay is a delay time depending on the input/output hardware of the Electronic Control Unit, FirstSOI is the predicted Start Of Injection value of the first actual injection of the train, Margin is a predetermined difference, expressed in crankshaft angle degrees, between the end of the second calculation task and the Start Of Injection of the first actual injection of the train, AngTooth is the number of degrees corresponding to one tooth of a crank position sensor and ceil is the ceiling function. An advantage of this embodiment is that it calculates the start of the second calculation task in order to perform it closer to the actual injection.

According to another embodiment of the present disclosure, the Electronic Control Unit is configured to calculate the energizing time of the first actual injection of the train as a function of a fuel rail pressure value sampled by a pressure rail sensor at the time of performance of the second calculation task, the apparatus including means to actuate the fuel injector for such energizing time. An advantage of this embodiment is that it gives more accurate information for the rail pressure because the rail pressure value is sampled closer to the actual injection, improving injection accuracy.

Another embodiment of the present disclosure provides a method of operating a fuel injector of an internal combustion engine including a cylinder housing a piston connected to a crankshaft and a fuel rail in fluid communication with the fuel injector to inject fuel into the cylinder, the internal combustion engine being managed by an Electronic Control Unit, wherein the method includes the steps of performing a first calculation task in order to calculate a set of Start Of Injection values of a train of injections, calculating an angular position of the crankshaft defining the start of a second calculation task, and performing the second calculation task in order to calculate a set of values of the energizing time of the injections of the train. The angular position is calculated as a function of the Start Of Injection value of the first injection of the train as calculated by the first calculation task.

This embodiment of the present disclosure achieves basically the same advantages of the control system described above, in particular those of getting a more accurate rail pressure sampling for the injection actuation and therefore improving the accuracy of the injection actuation and have it in line with the real expectations of the driver and of the engine conditions in that moment.

According to another aspect of the present disclosure, the method further includes calculating the energizing time of the first actual injection of the train as a function of a fuel rail pressure value sampled by a pressure rail sensor at the time of performance of the second calculation task, and actuating the fuel injector for such energizing time. This embodiment has the advantage of actually performing a more accurate injection.

According to an aspect of the present disclosure, the method further includes calculating the predicted Start Of Injection value of the first actual injection of the train starting from a Start Of Injection value of a main injection and subtracting the sum of all the energizing times and dwell times of all injections of the train terminating before the Top Dead Center Compression of the piston. An advantage of this embodiment is that it calculates the actual first Start Of Injection for each train of injections.

According to a further aspect of the present disclosure, the method further includes calculating the energizing times of all the injections terminating before the Top Dead Center Compression of the piston as a function of a fuel rail pressure value sampled at the time of the performance of the first calculation task. This embodiment has the advantage that it allows to estimate the energizing time values of the various injections of the train in order to calculate the actual first Start Of Injection for each train of injections.

According to another aspect of the present disclosure, the method further includes receiving fuel rail pressure values sampled by a pressure rail sensor at different instants in time during the performance of the train of injections and using the sampled fuel rail pressure values to calculate the energizing time of the remaining injections in the train of injections. An advantage of this embodiment is that it gives more accurate information for the rail pressure having only one pressure value for the whole injection pattern, improving injection accuracy.

According to still another aspect of the present disclosure, the method further includes calculating the angular position DIAngPos defining the start of the second calculation task according to the formula:

$$DIAngPos=ceil\{[(FuelCal+HWIODelay)_{ang}+FirstSOI+Margin]/AngTooth\}*AngTooth$$

where FuelCal indicates the worst case execution time for the calculations performed in the second calculation task, HWIODelay is a delay time depending on the input/output hardware of the Electronic Control Unit, FirstSOI is the predicted Start Of Injection value of the first actual injection of the train, Margin is a predetermined difference, expressed in crankshaft angle degrees, between the end of the second calculation task and the Start Of Injection of the first actual injection of the train, AngTooth is the number of degrees corresponding to one tooth of a crank position sensor and ceil is the ceiling function. An advantage of this embodiment is that it calculates the start of the second calculation task in order to perform it closer to the actual injection.

Another aspect of the present disclosure provides an apparatus for operating a fuel injector of an internal combustion engine including a cylinder housing a piston connected to a crankshaft and a fuel rail in fluid communication with the fuel injector to inject fuel into the cylinder, wherein the apparatus includes means to perform a first calculation task in order to calculate a set of Start Of Injection values of a train of injections, means to calculate an angular position of the crankshaft defining the start of a second calculation task, and means to perform the second calculation task in order to calculate a set of values of the energizing time of the injections of the train. The angular position is calculated as a function of the Start Of Injection value of the first injection of the train as calculated by the first calculation task. This embodiment of the present disclosure achieves basically the same advantages of the control system described above.

According to another embodiment of the present disclosure, the apparatus further includes means for calculating the predicted Start Of Injection value of the first actual injection of the train starting from a Start Of Injection value of a main injection and subtracting the sum of all the energizing times and dwell times of all injections of the train terminating before the Top Dead Center Compression of the piston. An advantage of this embodiment is that it calculates the actual first Start Of Injection for each train of injections.

According to a further embodiment of the present disclosure, the apparatus further includes means for calculating the energizing times of all the injections terminating before the Top Dead Center Compression of the piston as a function of a fuel rail pressure value sampled at the time of the performance of the first calculation task. This embodiment has the advantage that it allows to estimate the energizing time values of the various injections of the train in order to calculate the actual first Start Of Injection for each train of injections.

According to another embodiment of the present disclosure, the apparatus further includes means for receiving fuel rail pressure values sampled by a pressure rail sensor at different instants in time during the performance of the train of injections and to use the sampled fuel rail pressure values to calculate the energizing time of the remaining injections in the train of injections. An advantage of this embodiment is that it gives more accurate information for the rail pressure having only one pressure value for the whole injection pattern, improving injection accuracy.

According to still another embodiment of the present disclosure, the apparatus further includes means for calculating the angular position DIAngPos defining the start of the second calculation task according to the formula:

$$DIAngPos = ceil\{[(FuelCal + HWIODelay)_{ang} + FirstSOI + Margin]/AngTooth\} * AngTooth$$

where FuelCal indicates the worst case execution time for the calculations performed in the second calculation task, HWIODelay is a delay time depending on the input/output hardware of the Electronic Control Unit, FirstSOI is the predicted Start Of Injection value of the first actual injection of the train, Margin is a predetermined difference, expressed in crankshaft angle degrees, between the end of the second calculation task and the Start Of Injection of the first actual injection of the train, AngTooth is the number of degrees corresponding to one tooth of a crank position sensor and ceil is the ceiling function. An advantage of this embodiment is that it calculates the start of the second calculation task in order to perform it closer to the actual injection.

According to another embodiment of the present disclosure, the apparatus further includes means for calculating the energizing time of the first actual injection of the train as a function of a fuel rail pressure value sampled by a pressure rail sensor at the time of performance of the second calculation task, the apparatus including means to actuate the fuel injector for such energizing time. An advantage of this embodiment is that it gives more accurate information for the rail pressure because the rail pressure value is sampled closer to the actual injection, improving injection accuracy.

Another aspect of the present disclosure provides an automotive system including an internal combustion engine managed by an Electronic Control Unit, the engine being equipped with an a fuel injector in fluid communication with a fuel rail to inject fuel into a cylinder, the cylinder housing a piston connected to a crankshaft, the Electronic Control Unit being configured to perform a first calculation task in order to calculate a set of Start Of Injection values of a train of injections, calculate an angular position of the crankshaft defining the start of a second calculation task, and perform the second calculation task in order to calculate a set of values of the energizing time of the injections of the train. The angular position is calculated as a function of the Start Of Injection value of the first injection of the train as calculated by the first calculation task. This embodiment of the present disclosure achieves basically the same advantages of the control system described above.

The method according to one of the above aspects can be carried out with the help of a computer program including a program-code for carrying out the method described above, and in the form of computer program product including the computer program.

The computer program product can be embodied as a control apparatus for an internal combustion engine, including an Electronic Control Unit (ECU), a data carrier associated to the ECU, and the computer program stored in a data carrier, so that the control apparatus defines the embodiments described in the same way as the method. In this case, when the control apparatus executes the computer program all the steps of the method described above are carried out.

A still further aspect of the disclosure provides an internal combustion engine specially arranged for carrying out the method claimed.

BRIEF DESCRIPTION OF THE DRAWINGS

The present disclosure will hereinafter be described in conjunction with the following drawing figures, wherein like numerals denote like elements.

DETAILED DESCRIPTION OF THE DRAWINGS

The following detailed description is merely exemplary in nature and is not intended to limit the present disclosure or the application and uses of the present disclosure. Furthermore, there is no intention to be bound by any theory presented in the preceding background or the following detailed description. Preferred embodiments will now be described with reference to the enclosed drawings.

Figure 1:
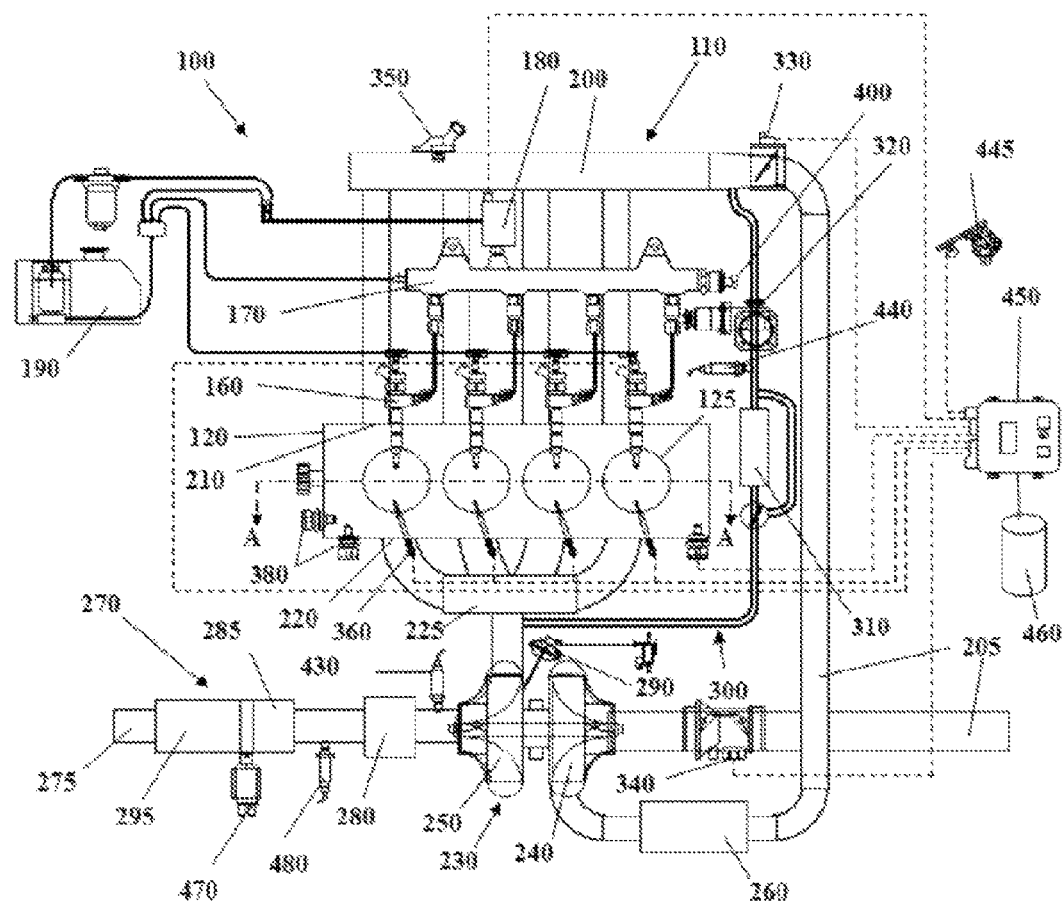
FIG. 1 shows an automotive system.
Figure 2:
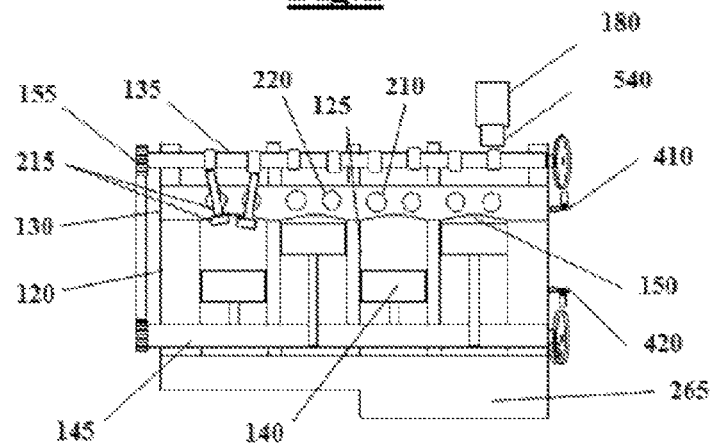
FIG. 2 is a cross-section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust after-treatment devices. The after-treatment devices may be any device configured to change the composition of the exhaust gases. Some examples of after-treatment devices include, but are not limited to, catalytic converters (two and three way), such as a Diesel Oxidation Catalyst (DOC) 285, lean NOx traps, hydrocarbon adsorbers, selective catalytic reduction (SCR) systems, SCRF (SCR on Filter) 280, and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, an exhaust pressure sensor and an exhaust temperature sensor 470, an EGR temperature sensor 440, a 1 sensor upstream 430 and 1 sensor downstream 480 of any of the above mentioned catalysts, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system, or data carrier 460, and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Figure 3:
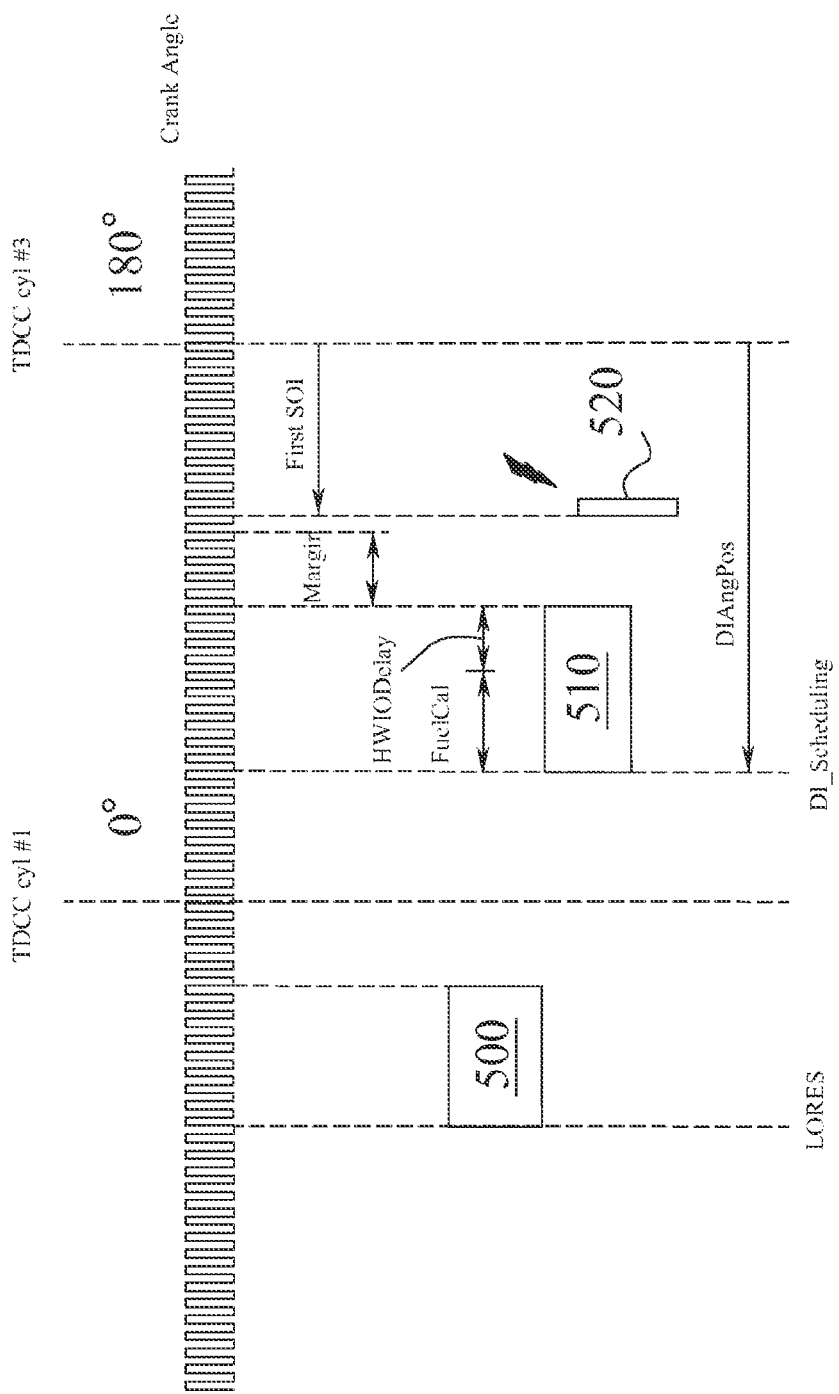
FIG. 3 is a schematic representation of the position of various ECU tasks as a function of crank angle.

FIG. 3 is a schematic representation of the position of various ECU tasks as a function of crank angle. Considering an injection that is to be performed into cylinder #3 and, in particular, considering the first injection of a multi-injection pattern, a first ECU tasks, namely the LORES Compression task 500 is scheduled to be performed at a certain crank angle well before the crank angle of the Top Dead Center Compression (TDCC) for cylinder #3. The LORES Compression task estimates several parameters of the train of injection pulses such as: pulses number, pulses fuel quantities, start of injection (SOI) and DT (Dwell Time) for all pulses of an injection pattern.

Moreover, the LORES Compression task also calculates the angular position DIAngPos at which the DI_Scheduling task 510 starts the calculations, using the following formula, hereinafter referenced as Formula (1):

$$DIAngPos = ceil\{[(FuelCal + HWIODelay)_{ang} + FirstSOI + Margin]/AngTooth\} * AngTooth$$

where:
FuelCal indicates the worst case execution time for the calculations performed in the DI_Scheduling task;
HWIODelay is a delay time depending on the input/output hardware of the ECU;
FirstSOI is the predicted crank angle of the first active pulse in the injection pattern;
Margin is a predetermined difference, expressed in crankshaft angle degrees, between the end of the DI_Scheduling task calculations and the Start Of Injection 520;
AngTooth is the number of degrees corresponding to one tooth of a crank position sensor 420; and
ceil is the ceiling function, namely the function that maps a real number into the smallest following integer.

Since FuelCal and HWIODelay are expressed in microseconds, they must be converted into crank angle degrees. The following Formula (2) may be used:

$$CA\ Degrees = Time[\mu s] * rpm * 6/10^6$$

where rpm are the revolutions per minute of the engine.

Exemplary values of the above variables are: FuelCal=1000 μs, HWIODelay=200 μs, Margin=18 degrees and AngTooth=6 degrees, being intended that these values are merely exemplary. Different engine systems may have different values without departing from the various embodiments of the present disclosure.

Figure 4:
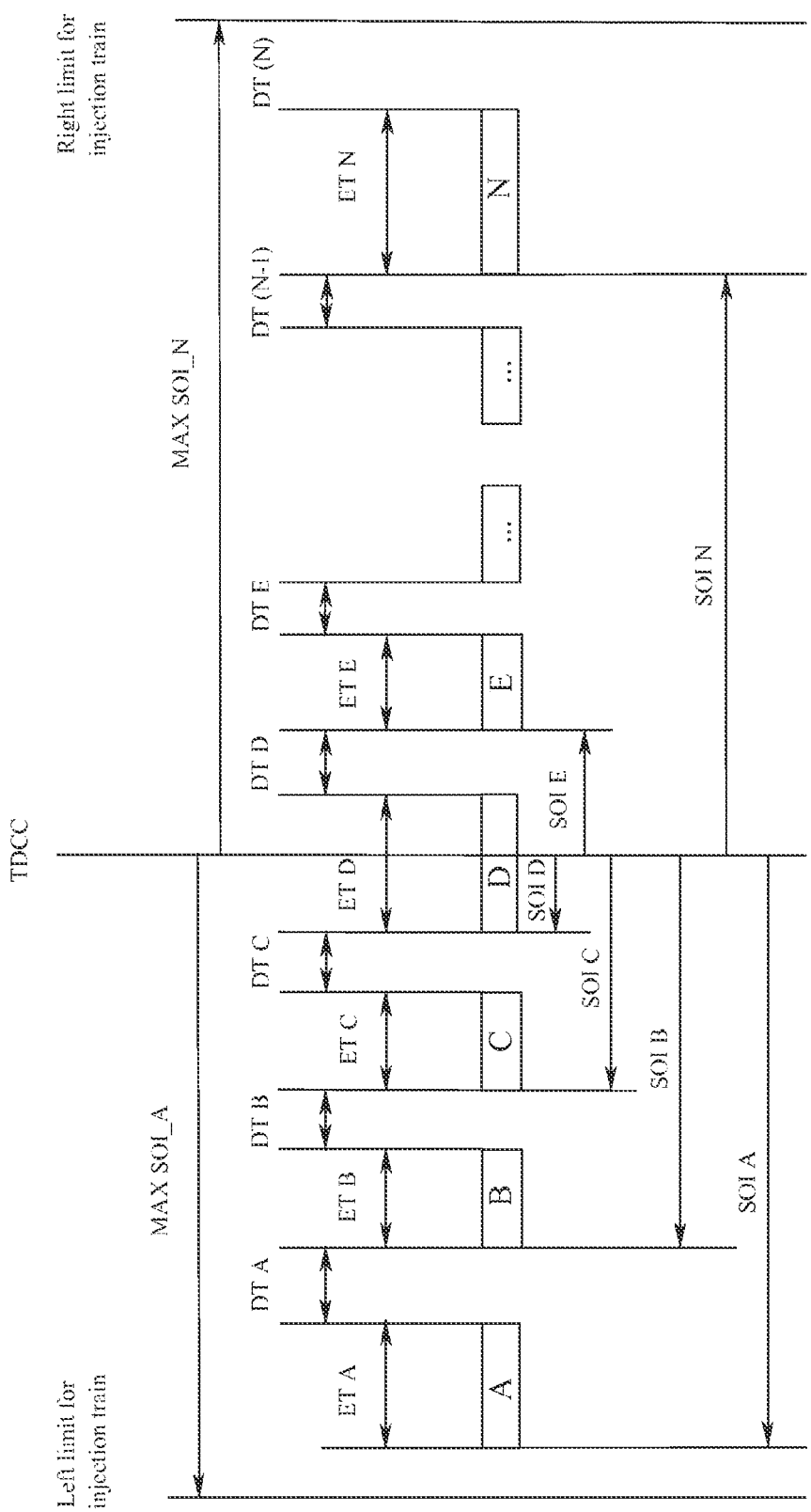
FIG. 4 is a schematic representation of a generic multi-injection pattern.

Since Formula (1) depends on the value of the predicted crank angle of the first active pulse in the injection pattern FirstSOI, in order to better understand the various embodiments of the present disclosure, a generic multi-injection pattern is schematically represented in FIG. 4. The injection pattern of FIG. 4 is composed of N injection pulses A,B,C, D . . . N, each injection pulse being defined by a respective Start of Injection $SOI_A$, $SOI_B$, $SOI_C$, $SOI_D$. . . $SOI_N$, by a respective Energizing Time $ET_A$, $ET_B$, $ET_C$, $ET_D$. . . $ET_N$ and a respective Dwell Time $DT_A$, $DT_B$, $DT_C$, $DT_D$, . . . $DT_N$.

However, there are many instances in which not all the injection pulses of the pattern of FIG. 4 have to be performed, depending on various engine parameters and other factors, such as, for example, the necessity of performing an increase in the temperature of the exhaust gas for aftertreatment regeneration purposes or for other purposes.

Figure 5:
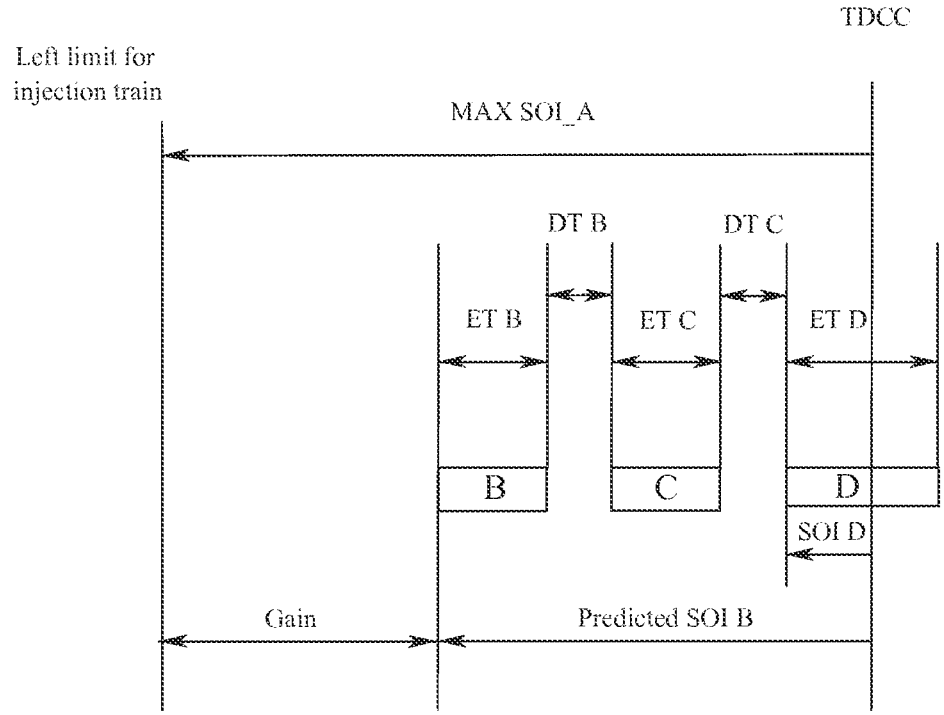
FIGS. 5 and 6 are exemplary multi-injection patterns to which respective embodiments of the present disclosure are applied.

For instance, in the exemplary injection pattern of FIG. 5, injection A is not to be performed, the injection pattern starting therefore from injection B. In a similar fashion, in the injection pattern of FIG. 6, both injection A and injection B have not to be performed, the injection pattern starting therefore from injection C. In both cases, the angular position of the DI_scheduling task can be postponed.

For the pattern of FIG. 5, a new angular position representative of the Start Of Injection of the first injection in the pattern can be predicted, and has been indicated in FIG. 5 as Predicted $SOI_B$. The Predicted $SOI_B$ angular value can be expressed by the sum of the $SOI_D$ angular position and of the terms $[DT_C + ET_C + DT_B + ET_B]|SOI$, namely evaluated as a SOI crank angle, in symbols:

$$\text{Predicted } SOI_B = SOI_D + [DT_C + ET_C + DT_B + ET_B]|SOI.$$

In fact the LORES Compression task estimates pulses number, pulses fuel quantities, start of injection (SOI) and DT (Dwell Time) for all pulses.

On the basis of these estimations, ET B, namely Energizing Time for pulse B, can be estimated as a function of the fuel quantity B requested estimated by the LORES Compression task and the rail pressure sampled at the time of said task by rail pressure sensor 400, namely:
$ET_B$=f(Rail pressure time sampled, B quantity requested)
In a similar fashion, $ET_C$ can be estimated:
$ET_C$=f (Rail pressure time sampled, C quantity requested)
With these data, the ECU 450 has all the information to formulate a prediction of the Predicted SOI B angular value and can use such value as a more accurate FirstSOI as input in formula (1). Formula (1) then outputs the angular position DIAngPos at which the DI_Scheduling task must start, an angular value that will be located closer to the actual angle of the first active pulse in the injection pattern analyzed. That means that the DI_Scheduling task can be started closer to the first active pulse of the injection pattern. At that time, the rail pressure read by rail pressure sensor 400 and used for the injection parameters calculation will be closer to the actual rail pressure present at the time of injection.

Figure 6:
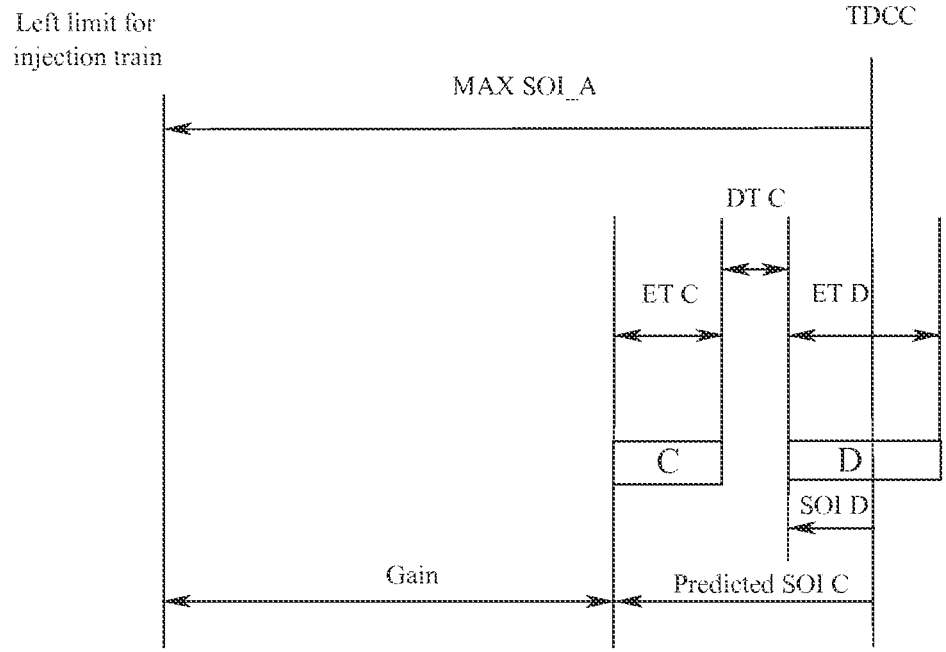

For the pattern of FIG. 6, a new angular position representative of the Start Of Injection of the first injection in the pattern can be predicted, and has been indicated as Predicted $SOI_C$. The Predicted $SOI_C$ angular position can be expressed by the sum of the $SOI_D$ angular position and the terms $[DT_C + ET_C]|SOI$, namely evaluated as a SOI crank angle, in symbols:

$$\text{Predicted } SOI_C = SOI_D + [DT_C + ET_C]|SOI.$$

Also in this case, $ET_C$, namely Energizing Time for pulse C, can be estimated as a function of the fuel quantity C requested estimated by the LORES Compression task and the rail pressure sampled at the time of said task, namely:
$ET_C$=f (Rail pressure time sampled, C quantity requested)
With these data, the ECU 450 has all the data to formulate a prediction of the angular value of the Predicted SOI C and can use such value as a more accurate FirstSOI in the formula (1). Formula (1) then outputs the angular position DIAngPos at which the DI_Scheduling task must start, an angular value that will be located closer to the actual angle of the first active pulse in the injection pattern analyzed in such a way the start of the DI_Scheduling task can be delayed even more in order to start closer to the first active pulse of this injection pattern. At that time, the rail pressure read by rail pressure sensor 400 and used for the injection parameters calculation will be closer to actual pressure present at the time of injection.

Figure 7:
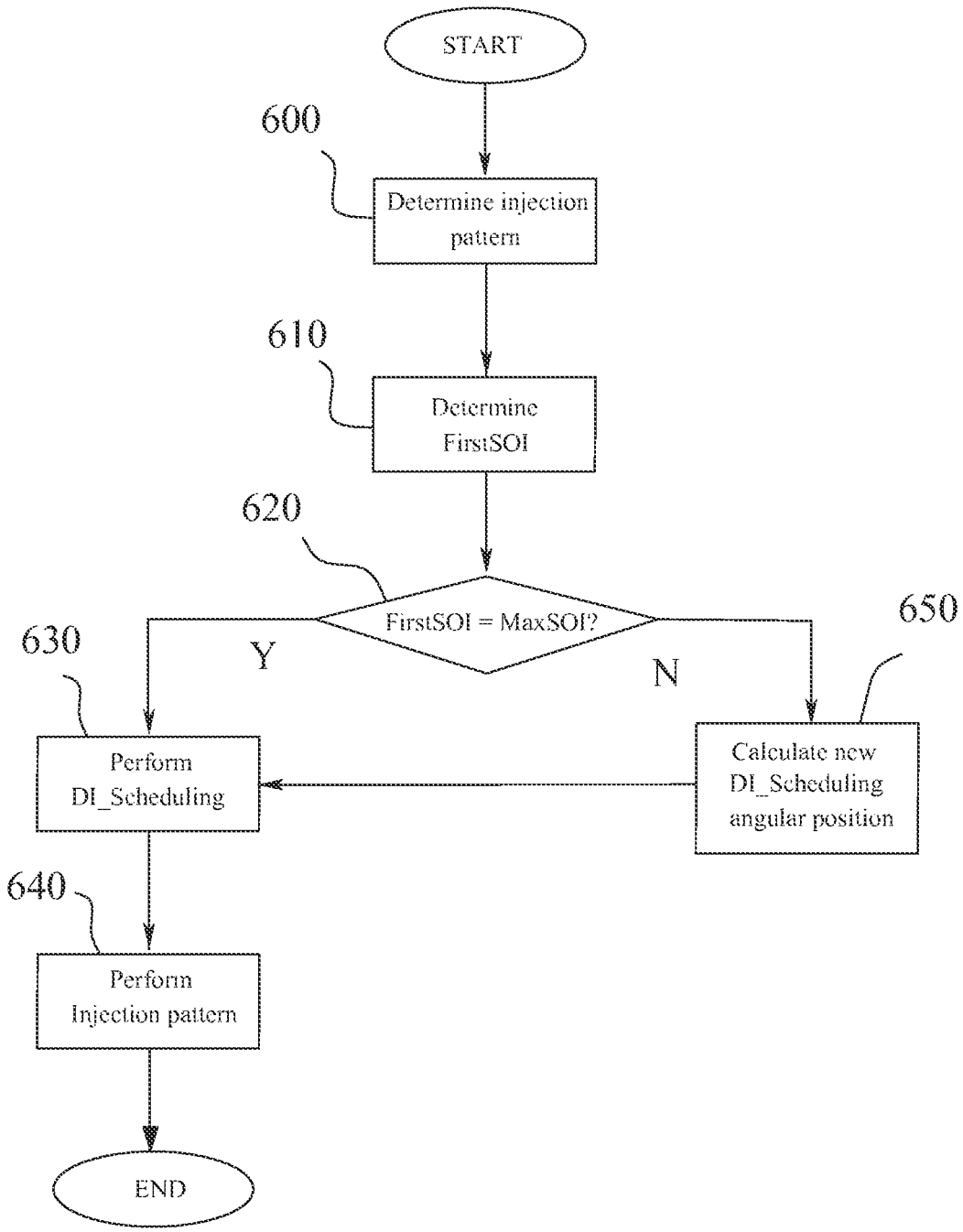
FIG. 7 shows a flowchart of a method for operating the fuel injector according to an embodiment of the present disclosure.

In general therefore, in an embodiment of the present disclosure represented in the flowchart of FIG. 7, a first step is performed in which an injection pattern, in terms of number of pulses, $SOI_i$, $DT_i$, $ET_i$ and fuel quantities is determined as a function of a torque request and other parameters and conditions (block 600).

On the basis of this information, the first active pulse in the injection pattern is determined (block 610). The angular value of this first active pulse is set as the value of the variable FirstSOI to be used in Formula (1). The angular value of the first active pulse may be determined as explained in the examples of FIGS. 5 and 6.

Then a check is made to determine if the angular value FirstSOI so determined is equal to a predetermined angular value MaxSOI that represents a SOI limit calculated in a worst case scenario where the injection pattern includes all the possible injections, such as the one represented in FIG. 4 (block 620).

If this check is positive, then the DI_Scheduling task is performed, starting from an angular position DIAngPos calculated according to Formula (1) (block 630) and, on the basis of the injection parameters calculated by such task, the injection pattern is performed (block 640).

If this check is negative, then a new DI_Scheduling task angular position DIAngPos is calculated using the new value of FirstSOI (block 650), such angular position DIAngPos being closer to the actual first injection of the pattern with respect to the angular position calculated with the predetermined angular value MaxSOI.

Once the new DI_Scheduling task angular position is calculated, the DI_Scheduling task is performed (block 630) at the new angular position and, on the basis of the injection parameters calculated by such task, the injection pattern is performed (block 640).

The above description makes reference to a case in which the ECU performs only two calculation tasks, namely LORES Compression and DI_Scheduling that are separated by different angular positions, but the various embodiments of the present disclosure can also be applied to the case in which more than two calculation tasks are scheduled in different angular positions for the ECU to perform.

By employing a plurality of calculation tasks, it may be possible to sample parameters used for the injection actuation, such as-in particular-the rail pressure, with even more accuracy with respect to the actual timing of the injections.

Figure 8:
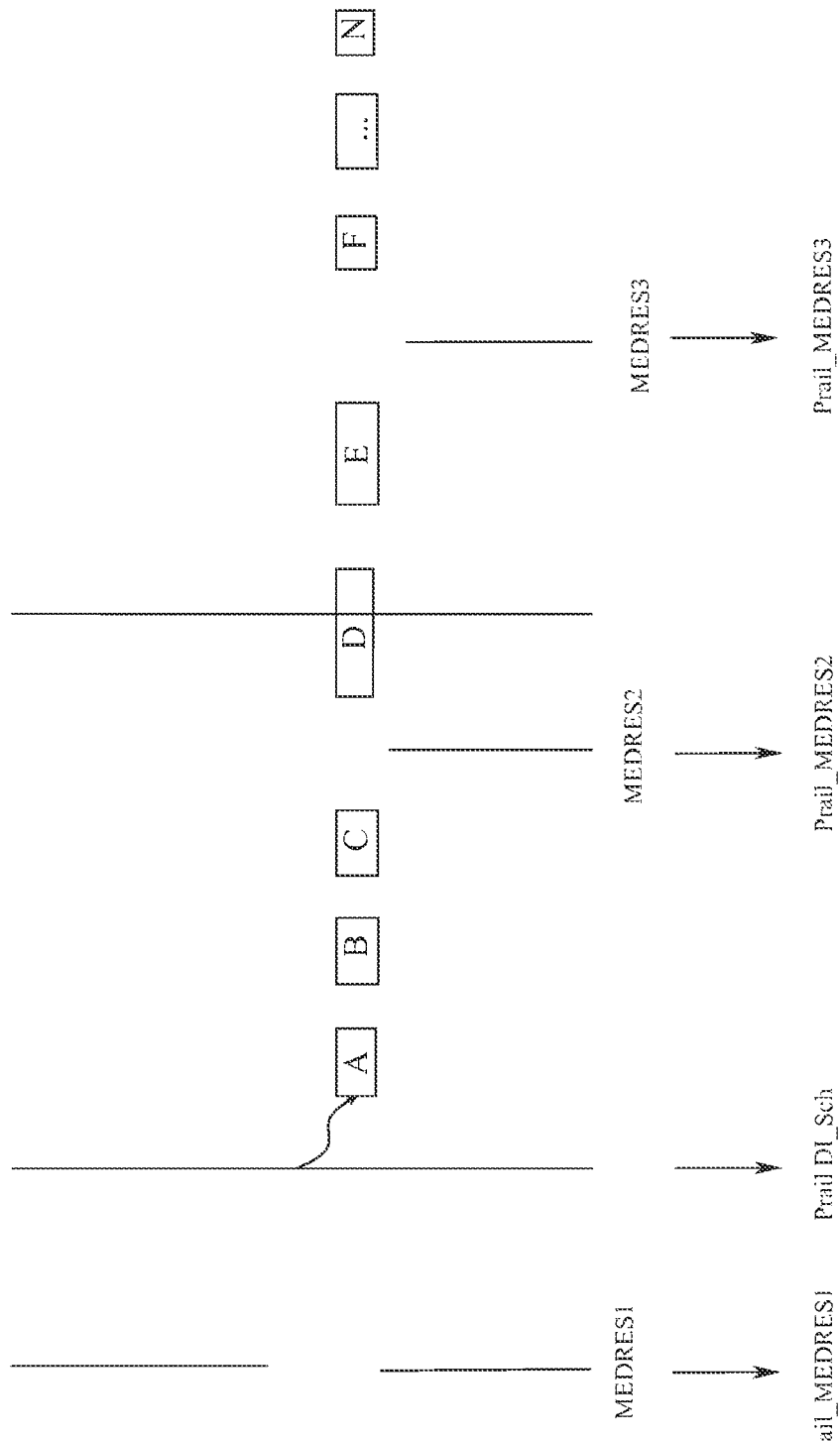
FIG. 8 is a graphic representation of the tasks that can be used to sample the rail pressure in different instants in time.

FIG. 8 represents aspects of another embodiment of the present disclosure. In case of multi-injection patterns, it may happen that the rail pressure that the DI_scheduling task uses at the start of the train of pulses has changed and therefore the estimated $ET_i$ energizing times may not be accurate, especially for the last injections of the train such as F . . . N in FIG. 8.

In this case, according to an embodiment of the present disclosure, the rail pressure is measured also in different instants MEDRES1, MEDRES2 . . . that occur along the train of impulses and these rail pressure values, which are closer in time to the actual injections of the train of injections, are used to refine the ET estimates.

For example after impulses A,B,C in FIG. 8, a new rail pressure value Prail_MEDRES2 is measured and used as input in the injection maps to calculate a new estimated time for injections D and E: $ET_D$, $ET_E$ and so on. The same can be done for another rail pressure value Prail_MEDRES3 for the last injections of the train F . . . N.

Also, another rail pressure value Prail_MEDRES1 can be measured at the time of the LORES Compression task to be used to perform the calculations of the LORES Compression task.

More specifically, for the calculation done by the DI_Scheduling task the rail pressure value at the time of the DI_Scheduling task can be used, as explained in the previous description, in order to calculate the ETs for the first three injections of the train A,B,C, in symbols:

$ET(A, B, C)$=InjTb1(Prail_DI_Sch, Qnty $A, B, C$) @ DI_Scheduling task

For some of the successive injections such as D and E, the rail pressure value Prail_MEDRES2 at the instant MEDRES2 can be used, in symbols:

$ET(D, E)$=InjTb1 (Prail_MEDRES2, Qnty$D, E$) @ MEDRES2 task

Finally, for the last injections of the train F . . . N, the rail pressure value Prail_MEDRES2 at the instant MEDRES 2 can be used, in symbols:

$ET(F, \ldots, N)$=InjTb1(Prail_MEDRES3, Qnty $F, \ldots, N$) @ MEDRES3 task.

Therefore, this embodiment samples rail pressure in angular positions that occur inside the injection pattern. Since the rail pressure sampled at every MEDRES instant is used to calculate the injection parameters for the incoming pulses, the information on the rail pressure is more accurate than having only one pressure value for the whole injection pattern, improving the injections accuracy.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A control apparatus for operating a fuel injector of an internal combustion engine having a cylinder housing a piston connected to a crankshaft and a fuel rail in fluid communication with the fuel injector to inject fuel into the cylinder, wherein the control apparatus comprises:
  an Electronic Control Unit with a processor configured to:
    perform a first calculation task in order to calculate a set of Start Of Injection values of a train of injections, the train of injections including a first injection;
    calculate an angular position of the crankshaft defining when to start a second calculation task;
    obtain a parameter for performing the second calculation task and concurrently perform the second calculation task according to the calculated angular position in order to calculate a set of values of the energizing time of the injections of the train; and
    control the fuel injector for regulating injection of fuel into the cylinder based on results of the first calculation task and the second calculation task;
    the angular position being calculated as a function of the Start Of Injection value of the first injection of the train as calculated by the first calculation task according to the formula:

$$\text{DIAngPos=ceil } \{[(\text{FuelCal+HWIODelay})_{ang}+\text{FirstSOI+Margin}]/\text{AngTooth}\}*\text{AngTooth}$$

where:
  FuelCal indicates a worst case execution time for the second calculation task;
  HWIODelay is a delay time depending on the input/output hardware of the ECU;
  FirstSOI is the predicted crank angle of the first active pulse in the injection pattern;
  Margin is a predetermined difference, expressed in crankshaft angle degrees, between the end of the second calculation task and the Start Of Injection;
  AngTooth is the number of degrees corresponding to one tooth of a crank position sensor; and ceil is a ceiling function that maps a real number into the smallest following integer.

2. The control apparatus as in claim 1, in which the Electronic Control Unit is further configured to calculate a predicted Start Of Injection value of the first actual injection of the train starting from a Start Of Injection value of a main injection and subtracting the sum of all the energizing times and dwell times of all injections of the train terminating before the Top Dead Center Compression of the piston.

3. The control apparatus as in claim 1, in which the Electronic Control Unit is further configured to calculate the energizing times of all the injections terminating before the Top Dead Center Compression of the piston as a function of a fuel rail pressure value sampled at the time of the performance of the first calculation task.

4. The control apparatus according to claim 1, wherein the Electronic Control Unit is further configured to receive fuel rail pressure values sampled by a pressure rail sensor at different instants in time during the performance of the train of injections and to use the sampled fuel rail pressure values to calculate the energizing time of the remaining injections in the train of injections.

5. The control apparatus according to claim 1, wherein the Electronic Control Unit is further configured to calculate the energizing time of the first actual injection of the train as a function of a fuel rail pressure value sampled by a pressure rail sensor at the time of performance of the second calculation task and to actuate a fuel injector for such energizing time.

6. A method of operating a fuel injector of an internal combustion engine including a cylinder housing a piston connected to a crankshaft and a fuel rail in fluid communication with the fuel injector to inject fuel into the cylinder, the internal combustion engine being managed by an Electronic Control Unit, wherein the method comprises:
performing, by the Electronic Control Unit, a first calculation task in order to calculate a set of Start Of Injection values of a train of injections, the train of injections including a first injection;
calculating, by the Electronic Control Unit, an angular position of the crankshaft defining when to start a second calculation task;
obtaining, by the Electronic Control Unit, a parameter for performing the second calculation task and concurrently performing, by the Electronic Control Unit, the second calculation task according to the calculated angular position in order to calculate a set of values of the energizing time of the injections of the train; and
controlling, by the Electronic Control Unit, the fuel injector for regulating injection of fuel into the cylinder based on results of the first calculation task and the second calculation task;
the angular position being calculated as a function of the Start Of Injection value (FirstSOI) of the first injection of the train as calculated by the first calculation task according to the formula:

$$DIAngPos=\text{ceil}\{[(FuelCal+HWIODelay)_{ang}+FirstSOI+Margin]/AngTooth\}*AngTooth$$

where:
FuelCal indicates a worst case execution time for the second calculation task;
HWIODelay is a delay time depending on the input/output hardware of the ECU;
FirstSOI is the predicted crank angle of the first active pulse in the injection pattern;
Margin is a predetermined difference, expressed in crankshaft angle degrees, between the end of the second calculation task and the Start Of Injection;
AngTooth is the number of degrees corresponding to one tooth of a crank position sensor; and
ceil is a ceiling function that maps a real number into the smallest following integer.

7. A method according to claim 6 further comprising:
calculating the energizing time of the first actual injection of the train as a function of a fuel rail pressure value sampled by a pressure rail sensor at the time of performance of the second calculation task; and
actuating the fuel injector for such energizing time.

8. A computer program comprising a computer-code suitable for performing the method according to claim 6.

9. A computer program product comprising a microprocessor configured to execute a computer-code for performing the method according to claim 6.

10. A non-transitory computer readable medium comprising a computer-code suitable for programming a microprocessor to perform the method according to claim 6.

11. An automotive system comprising:
an internal combustion engine having a fuel injector in fluid communication with a fuel rail to inject fuel into a cylinder housing a piston connected to a crankshaft;
an Electronic Control Unit that is configured to manage the internal combustion engine, the Electronic Control Unit having a processor configured to:
perform a first calculation task in order to calculate a set of Start Of Injection values of a train of injections, the train of injections including a first injection;
calculate an angular position of the crankshaft defining when to start a second calculation task;
obtain a parameter for performing the second calculation task and concurrently perform the second calculation task according to the calculated angular position in order to calculate a set of values of the energizing time of the injections of the train; and
control the fuel injector for regulating injection of fuel into the cylinder based on results of the first calculation task and the second calculation task;
the angular position being calculated as a function of the Start Of Injection value of the first injection of the train as calculated by the first calculation task according to the formula:

$$DIAngPos=\text{ceil}\{[(FuelCal+HWIODelay)_{ang}+FirstSOI+Margin]/AngTooth\}*AngTooth$$

where:
FuelCal indicates a worst case execution time for the second calculation task;
HWIODelay is a delay time depending on the input/output hardware of the ECU;
FirstSOI is the predicted crank angle of the first active pulse in the injection pattern;
Margin is a predetermined difference, expressed in crankshaft angle degrees, between the end of the second calculation task and the Start Of Injection;
AngTooth is the number of degrees corresponding to one tooth of a crank position sensor; and
ceil is a ceiling function that maps a real number into the smallest following integer.

* * * * *